Oct. 19, 1971     H. P. MOYER     3,613,128
SELF-RIMMING PORCELAIN ENAMELED SINK
Filed May 18, 1970
Fig. 1
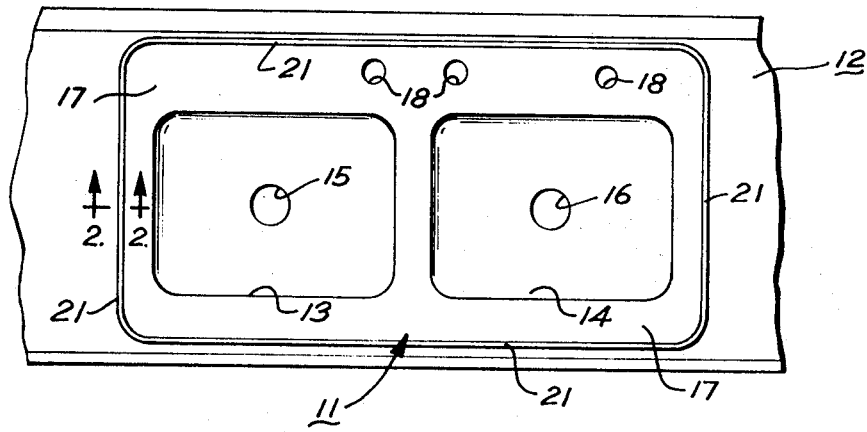
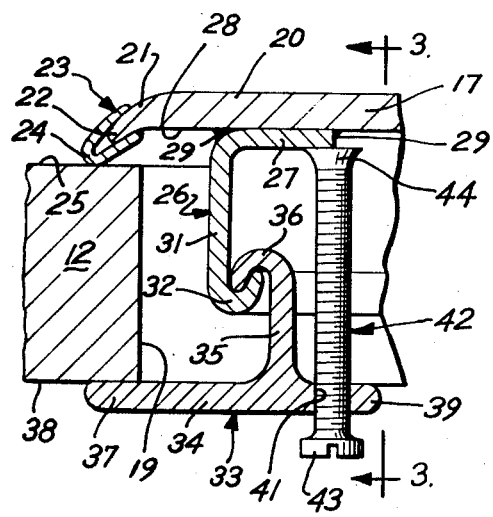
Fig. 2
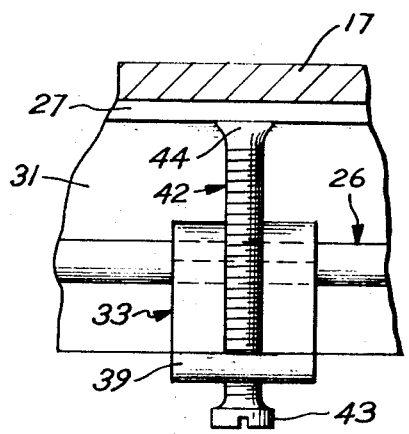
Fig. 3
INVENTOR.
HARRIS P. MOYER
BY
Molinare, Allegretti, Newitt & Witcoff
ATTORNEYS

United States Patent Office 3,613,128
Patented Oct. 19, 1971

3,613,128
SELF-RIMMING PORCELAIN ENAMELED SINK
Harris P. Moyer, Deerfield, Ill., assignor to
Unarco Industries, Inc.
Filed May 18, 1970, Ser. No. 38,291
Int. Cl. E03c 1/18
U.S. Cl. 4—187
10 Claims

ABSTRACT OF THE DISCLOSURE

An improved self-rimming porcelain enameled sink including a novel clamping channel used for securing the porcelain enameled sink in a counter top. The clamping channel is mounted on the underside of the sink and cooperates with a lug that engages the underside of the counter top to secure the sink in the counter top. A stainless steel bead is bonded completely around the peripheral edge of the porcelain enameled sink so that this bead protects the edge during installation and usage and so that the combined edge-bead will extend from the sink a sufficient distance to cover the ragged edges of the hole in the counter top in which the sink is mounted. A tight water seal is formed between the bead and the counter top.

SUMMARY OF THE INVENTION

This invention relates to an improved self-rimming porcelain enameled sink and more particularly, to an improved porcelain enameled steel sink which by utilizing a novel clamping channel and edge protecting, stainless steel bead, combines the advantages of a porcelained enamel finish with the advantageous ease of installation heretofore found only in self-rimming, stainless steel sinks.

Porcelained enameled steel sinks comprise a substantial portion of the total number of sinks sold at the present time. One of the principal advantages of porcelained enameled sinks is the durability of its surface coating with respect to ordinary usage and wear. However, a major disadvantage of porcelained enameled steel sinks is a tendency of the enameled coating to chip or spall off, particularly at the edges and around the corners.

Presently virtually all porcelain enameled sinks which are installed in counter tops and the like are secured in the counter tops (more specifically, in holes cut in the counter tops) by a separate ring or frame, commonly called a "Houdee rim." The "Houdee" rim has a generally T-shaped cross-section and is positioned around the edge of the sink between the sink and the counter top. In addition to being used to secure the sink in a counter top, the "Houdee" rim also protects the relatively fragile porcelain coating on the edge of the sink against chipping, covers the ragged edges of the holes cut in the counter top, and provides a water seal between the "Houdee" rim and the counter top and between the "Houdee" rim and the sink. The principal disadvantage of the use of the "Houdee" rim is that it is an extra piece which must be handled and adjusted during installation of a sink and this, of course, increases the time, and thus the cost, required for proper installation of a sink.

With the advent of the use of stainless steel sinks, a so-called "self-rimming" stainless steel sink was developed. A self-rimming stainless steel sink does not require the use of a "Houdee" rim (hence the name "self-rimming") and is clamped in a counter top by an independent means which does not extend between the edge of the sink and the counter top. It is possible to use this self-rimming feature with the stainless steel sinks because the edges of the sinks are relatively strong and can be extended so as to overlay and cover the ragged edges of the hole in the counter top and to form a water seal between the extended edge of the sink and the counter top. Moreover, there is no need to use a "Houdee" rim to protect the edges against chipping during installation and usage since stainless steel does not chip as does a porcelain enameled coating.

Although rimmed stainless steel sinks (i.e., sinks using a "Houdee" rim) are available, the sales of self-rimming stainless steel sinks have grown to the point where they now constitute approximately 95 to 100% of the stainless steel sink market. This sales growth, at least in part, resulted from the relative ease with which these self-rimming sinks can be installed.

According to my invention, a porcelain enameled sink may be satisfactorily installed without the necessity of using a "Houdee" rim or other similar separate member. The elimination of the need to use the "Houdee" rim, of course, reduces the time required to install a porcelain enameled sink and thus reduces the cost of such an installation. In other words, the improved porcelain enameled sinks of my invention are able to be fabricated as "self-rimming" sinks and therefore include not only the advantages of porcelain enameled sinks but also the advantage of ease of installation heretofore found only in "self-rimming" stainless steel sinks.

More specifically, the improved, self-rimming porcelain enameled sink of the present invention includes a novel, generally L-shaped channel which has one arm secured to the underside of the sink adjacent to the edge of the sink. The other arm of the channel has an arcuate portion formed thereon adapted to engage the arcuate portion of an upstanding arm formed on a lug. A portion of the base of a lug extends beneath the lower surface of the adjacent counter top and another portion of the base of the lug has a threaded aperture therein which receives a threaded, relatively movable screw. The screw has a flattened end adapted to be abutted against the underside of the sink. The channel and the lug are arranged and cooperate together so that when the screw is brought into abutment with the underside of the sink, the sink may be clamped within the hole formed in the counter top.

The improved self-rimming porcelain enameled sink of the present invention also includes a stainless steel bead or edging which is bonded to and overlies the edge of the sink and protects the relatively fragile porcelain enameled coating on the edge of the sink both during installation and usage. This stainless steel bead also covers the ragged edge of the hole cut in the counter top thereby giving the installed sink a neat, commercially attractive appearance. In addition, the stainless steel bead forms an excellent water seal between the sink and the counter top.

Accordingly, it is a primary object of the present invention to provide an improved porcelain enameled sink which permits the practical installation of the sink in a counter top without requiring the use of a "Houdee" rim or other similar separate member.

Another object of the present invention is to provide an improved porcelain enameled sink which is self-rimming and therefore may be easily and quickly installed in a counter top.

Still another object of the present invention is to provide an improved, self-rimming, porcelain enameled sink wherein novel channels are secured to the underside of the sink adjacent to and along each of the straight edges thereof and wherein these channels cooperate with a plurality of lugs to clamp the sink securely within the hole cut in the counter top.

Another object of the present invention is to provide an improved self-rimming, porcelain enameled sink wherein a stainless steel bead is bonded to the edge of the sink and wherein the stainless steel bead is utilized to protect the relatively fragile coating on the edge against chipping both during installation and usage, to cover the ragged edges of the hole in the counter top and to form and maintain a water seal between the sink and the counter top.

These and other objects and advantages of the present invention will become apparent from the following description of the preferred embodiment of this invention.

BRIEF DESCRIPTION OF THE DRAWINGS

Referring to the drawings, wherein like reference numerals indicate like parts throughout the three figures wherein:

FIG. 1 is a top plan view of an improved "self-rimming" porcelain enameled steel sink embodying the principles of my invention;

FIG. 2 is a vertical cross-sectional view taken along line 2—2 in FIG. 1; and

FIG. 3 is a partial vertical cross-sectional view taken along line 3—3 in FIG. 2.

DESCRIPTION OF THE PREFERRED EMBODIMENT

Referring now to FIG. 1, an improved porcelain enameled steel sink embodying the principles of the present invention is shown generally at 11 and is mounted as hereinafter described, in a counter top 12. The sink 11 has two sink bowls 13 and 14 of conventional configuration. Apertures 15 and 16 are formed in the bottoms of the bowls 13 and 14, respectively, and are adapted to be connected to a drain. The sink 11 also includes a generally horizontally disposed deck 17 which generally surrounds the bowls 13 and 14 and which has three apertures 18 cut therein that are adapted to be used to accommodate the hot and cold water faucets and a spray attachment. As best shown in FIGS. 2 and 3, the sink 11 is positioned within a hole 19 cut in the counter top 12.

An edge 21 extends completely about the periphery of the deck 17 of the sink 11. The edge 21 is bent or flanged over so that the plane of the deck 17 is higher than the terminal end 22 of the edges 21 thereby giving the sink a "crowned" appearance. Aside from providing a more commercially attractive appearance, it is believed that this "crowning" assists in maintaining the edge 21 flat during the "firing" of the porcelain enamel coating on the steel sink.

A thin, narrow, stainless steel, hairpin-like bead or edging 23 is disposed completely about the edge 21 of the sink 12. This stainless steel bead 23 is bonded to the edge 21 in a conventional manner after the porcelain coating has been "fired" on the sink. This bead 23 protects the fragile porcelain coating on the edge 21 against chipping during installation and usage of the sink and in addition, serves to extend the edge 21 of the sink so that the edge 21, as extending by the bead 23, overlies the ragged edges of the opening 19 in the counter top 12. As best illustrated in FIG. 2, the bead 23 includes a curved terminal end 24 which is brought into contact with the upper surface 25 of the counter top 12 when the sink 11 is installed on the counter top 12. And this contact between the end 24 of the bead 23 and the upper surface 25 of the counter top 12 forms a water tight seal between the sink 11 and the counter top 12.

Also as best shown in FIG. 2, the end 24 of the bead 23 is spaced from end 22 of the edge 21 and this spacing permits the bead 23 to flex relative to the end 22 so as to minimize the stress on the porcelain coating on the edge 21 during installation of the sink and to obviate the chipping of this coating both during installation and usage of the sink.

A channel 26 has a generally L-shaped cross-section and has one arm 27 which is welded to the under surface 28 of the deck 17, as shown at 29. The other arm 31 of the channel 26 is disposed generally perpendicular to the plane of the deck 17 and has an arcuate or hook-like portion 32 formed in its lower terminal end. The channel 31 extends along the entire length of the left side of the sink, as shown in FIG. 1, and channels, structurally and functionally identical to channel 31, extend along the entire length of the other three straight sides of the sink 11. Preferably these channels are welded to the underside 28 of the deck 17 prior to the "firing" of the porcelain coating so as to support and to minimize warpage of the edge 21 during the porcelain "firing" process.

A lug 33 includes a generally horizontally disposed base 34 having an integral arm 35 which extends upwardly and perpendicular to the plane of the base 34. The arm 35 has as arcuate or hook-like portion 36 formed in its upper terminal end and this arcuate portion 36 is substantially identical, in configuration and shape, to the arcuate portion 32 formed on the channel 26. The portions 32 and 36 are designed to be coupled together so that force may be transmitted therethrough, as hereinafter described.

When the lug 33 is disposed as in FIGS. 2 and 3, one end 37 of the base 34 extends under the counter top 12 and contacts the undersurface 38 of the top 12 adjacent to the hole 19. The end 39 of the base 34 remote from end 37, has a threaded hole 41 therein. A threaded screw 42 is threadedly received within the hole 41. The screw 42 includes a slotted head 43 and a flattened end 44 which may be brought into or out of contact with the arm 27 of the channel 31 by rotation of the screw 42.

The installation of the sink 11 is accomplished by positioning the sink within the hole 19 in the counter top 12 so that the sink is resting on the stainless steel bead 23 bonded on the edge 21 of the deck 17. A lug 33 is then positioned so that the arcuate portion 36 is disposed in or coupled with the arcuate portion 32 of the channel 31 as in FIG. 2. The lug 33 is arranged so that its end 37 is positioned beneath the counter top 12. Thereafter clockwise rotation of the screw 42 results in its end 44 being brought into contact with the arm 27 of the channel 31. Continued clockwise rotation of the screw 42 causes the sink 11 to be tightly clamped with the hole 19 and a water seal to be formed between the end 24 of the bead 23 and the upper surface 25 of the top 12. The stainless steel bead 23 minimizes the chances of the porcelain surface on the edge 21 being chipped during this clamping process. Of course, the sink may be removed from the counter top 12 by the simple expedient of rotating the screw 42 in a counterclockwise direction until its end 44 is moved out of contact with the arm 27 of the channel 31 and thereafter removing the lug from engagement with the arcuate portion 32 of the channel 31. Additional lugs, structurally identical to the lug 33, would also be used, in the same manner as lug 33, with channel 31 and the other three channels to securely mount the sink 11 in the top 12.

As an example of a practical embodiment of the present invention, the channels 31 which would be utilized with a conventional kitchen sink of the type shown in FIG. 1, would have dimensions of 9/16″ x 9/16″ x .025 inch thick, and the stainless steel bead 23 would be made from .015″ stainless steel. To achieve the "crowning" effect, the end 22 of the edge 21 would be disposed approximately ¼″ below the plane of the deck 20.

In view of the foregoing, it is apparent that my invention permits a self-rimming type of mounting to be utilized with a porcelain enameled sink and eliminates the need to use a "Houdee" rim which heretofore had to be used to satisfactorily mount porcelain enamelel sinks. This permits relatively facile mounting of the improved sink of my invention. Thus my invention permits the advantageous "self-rimming" feature, heretofore only available with stainless steel sinks, to be combined, for the first time, with advantages of porcelain enameled steel sinks, and as a result, sinks embodying the principles of my invention have significant commercial possibilities. Another advantageous feature of my invention is the stainless steel bead which is bonded to the edge of the sink deck, which protects the relatively fragile porcelain surface on this edge during installation and use and which provides an excellent water seal between the sink and the counter top.

In conclusion, it should be noted that while the foregoing description refers to the improved sink of my invention being mounted in a counter top, the sink could also be mounted in a vanity or other similar receptacle. Moreover, the lug 33 could also be designed so that the end 44 of the screw 42 did not abut the arm 27 of the channel 31 but rather abutted the undersurface 28 of the deck 20 directly. Therefore, it is clear that my invention may be embodied in other specific forms without departing from the spirit or central characteristics thereof and the preferred embodiment described above is thus to be considered in all respects as illustrative and not restrictive, the scope of my invention being indicated by the appended claims rather than by the foregoing description and all changes which come within the meaning and range of equivalency of the claims are therefore intended to be embraced therein.

I claim:

1. An improved self-rimming porcelain enameled sink adapted to be mounted in a hole in a counter top or the like, the improved sink comprising: a generally horizontally disposed deck having a peripheral edge formed thereon, with both the deck and said edge having porcelain coating thereon; first means connected with said edge and adapted to contact the upper surface of the counter top when the sink is installed in the counter top; second means connected with said edge and adapted to form a water seal between said edge and the upper surface of the counter top; third means connected with said edge and adapted to protect the porcelain coating on said edge during installation of the sink in the counter top; and channel means attached to the underside of the deck adjacent to said edge and adapted to cooperate with a securing means, which is positioned completely beneath the deck of the sink, to clamp the sink in the counter top.

2. The improved self-rimming sink described in claim 1 wherein the first means adapted to contact the upper surface of the counter top, the second means adapted to form a water seal and the third means adapted to protect said edge are a metallic beading which is positioned around said edge.

3. The improved self-rimming sink described in claim 2 wherein the metallic beading is a thin, hairpin-like stainless steel bead; and wherein the end of the bead is spaced from the terminal end of said edge.

4. The improved self-rimming sink described in claim 1 wherein the first means adapted to contact the upper surface of the counter top is a metallic beading which is positioned around said edge.

5. The improved self-rimming sink described in claim 4 wherein the metallic beading is adapted to overlie and thus cover the edges of the hole in the counter top in which the sink is mounted; and wherein the terminal end of the metallic beading is the second means adapted to form a water seal between the counter top and said edge.

6. The improved self-rimming sink described in claim 4 wherein the metal beading is also the third means to protect said edge.

7. The improved sink described in claim 1 wherein the channel means includes a generally L shaped channel which has one arm secured to the underside of the deck and which has another arm that includes an arcuate portion adwapted to be coupled with a similar arcuate portion formed on a lug which has a first part adapted to abut against the lower surface of the counter top and which has a second part that carries a relatively moveable screw means adapted to abut against the underside of the deck of the sink.

8. The improved self-rimming sink described in claim 7 wherein the first means adapted to contact the upper surface of the counter top, the second means adapted to form a water seal and the third means adapted to protect said edge are a metallic beading which is positioned around said edge.

9. The improved self-rimming sink described in claim 8 wherein the metallic beading is a thin hairpin-like stainless steel bead, and wherein the end of the bead is spaced from the terminal end of said edge.

10. The improved self-rimming sink described in claim 9 wherein said edge is disposed below the plane of the deck of the sink.

References Cited

UNITED STATES PATENTS

| | | | |
|---|---|---|---|
| 2,672,621 | 3/1954 | Drain | 4—187 |
| 2,885,691 | 5/1959 | Juergens | 4—187 |
| 2,925,609 | 2/1960 | Richardson | 4—187 |
| 3,034,150 | 5/1962 | Lyon | 4—187 |
| 3,110,040 | 11/1963 | Richardson | 4—187 |
| 3,369,261 | 2/1968 | Tiller | 4—191 X |

LAVERNE D. GEIGER, Primary Examiner

D. B. MASSENBERG, Assistant Examiner